United States Patent [19]

Luepertz et al.

[11] 4,114,430

[45] Sep. 19, 1978

[54] BRAKE SYSTEM TESTER

[75] Inventors: Hans-Henning Luepertz, Darmstadt; Bernhard Fischenich, Kronberg, both of Germany

[73] Assignee: ITT Industries, Inc., New York, N.Y.

[21] Appl. No.: 800,379

[22] Filed: May 25, 1977

[30] Foreign Application Priority Data

May 28, 1976 [DE] Fed. Rep. of Germany ....... 2623912

[51] Int. Cl.² .......................................... G01M 17/00
[52] U.S. Cl. ...................................... 73/121; 73/149
[58] Field of Search ......................... 73/121, 129, 149

[56] References Cited

U.S. PATENT DOCUMENTS 2,967,427  1/1961  LeBlanc .............................. 73/149

*Primary Examiner*—Jerry W. Myracle
*Attorney, Agent, or Firm*—John T. O'Halloran

[57] ABSTRACT

A method for locating defects in a hydraulic brake system, in which a master cylinder is in communication with the outlet port of a compensating reservoir, which includes the steps of placing a measuring burette on the compensating reservoir's outlet port and operating the brakes to measure and determine the volume of brake fluid that flows from the master cylinder to the compensating reservoir when the brake is applied. A compensating reservoir making use of the method includes a measuring opening adapted to be closed by a measuring burette positioned above the outlet port of a compensating reservoir which outlet port is in communication with the master cylinder. Where the compensating reservoir includes a float acting as a level indicator, which is connected by a rod to a circuit operating contact piece or member, the rod is hollow and is arranged to pass through the float and the contact piece. The outlet port of the compensating reservoir has a measuring opening which is arranged coaxially with the hollow rod.

3 Claims, 1 Drawing Figure

U.S. Patent  Sept. 19, 1978  4,114,430
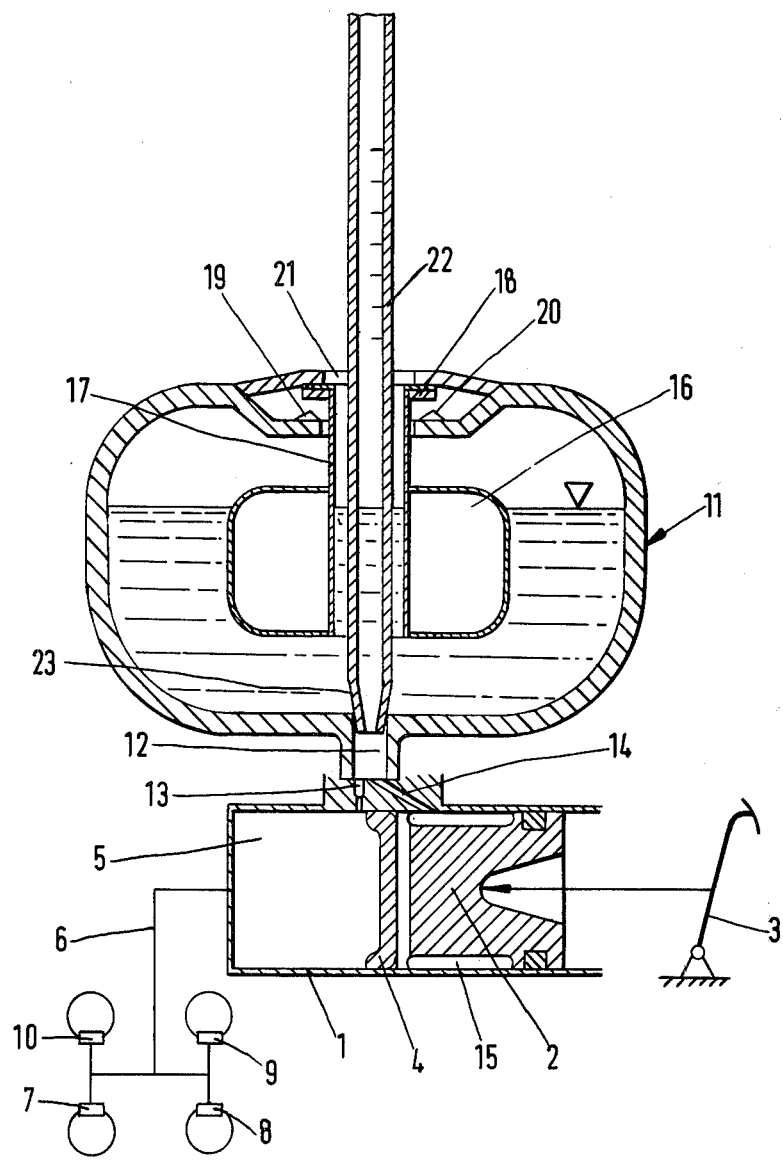

BRAKE SYSTEM TESTER

In order to maintain a high degree of safety in traffic it is indispensable to regularly check the brake systems for any defects. High garage costs and quite often insufficiently qualified garage personnel make it imperative that the mode of application of such a method for locating defects be as easy and fast as possible.

In case of e.g. insufficient sealing action of the primary seal of a master piston, in the event of a continued operation of the brake, brake fluid may leak out from the working chamber of the master piston and pass along the primary seal into the chamber behind the master cylinder piston whence it may enter the compensating reservoir. The master cylinder will slowly travel the full distance of its maximum stroke whereupon no further pressure build-up is possible. The driver may notice such leakage of the primary seal by pressing the brake pedal for a prolonged time when the vehicle is at rest, thus checking whether or not the brake pedal will be moved right down to the bottom plate. At present, a more exact check on the primary seal is made in garages by keeping the brake pedal in a certain position and interconnecting a pressure gauge in the brake system. By means of the pressure gauge it is checked for a prolonged time whether or not the pressure in the brake system remains constant.

This method is disadvantageous in that in cases of slight leakage, when the giving way of the brake pedal will only occur after a prolonged time, the pressure decrease will also be very slow. As a result of elasticities of the brake pedal and of the device that serves for prestressing the brake pedal, small pedal travels will hardly lead to a decrease in the braking pressure.

In some of the defective primary seals, leakage only appears at the onset of the braking action, while they are fully operable with higher braking pressures. This defect cannot be located at all by the known methods.

A general disadvantage of the known method for locating defects lies in the fact that the pressure system of the brake system must be opened for the connection of the pressure gauge, this operation implying the danger of air entering the brake system. If the brake system does not work properly this might also involve brake fluid losses. In extreme cases, it must even be feared that the brake system is not properly closed again after disassembling the pressure gauge.

When checking a brake system, besides locating leakage of primary seals, it is also desirable to spot any further defects such as e.g. excessive disc brake run-out which causes the brake disk to move the brake piston unduly far back into the brake cylinders. This will result in an excessive clearance to be noted in the form of an unduly large idle stroke of the brake pedal.

The present invention has as an object to provide for a method for locating defects in a hydraulic brake system which can be easily and rapidly applied and where there is no need of opening the hydraulic brake system. A further object is the provision of a compensating reservoir which is especially suited to the needs of application of the inventive checking method.

According to the invention, the first object on which it is based is solved by means of sealingly placing a burette on the outlet port in order to respectively measure and ascertain the volume of brake fluid that flows from the master cylinder to the compensating reservoir after the brake has been applied.

As for the application of this method all that must be done is to open the compensating reservoir of the brake system in order to sealingly place the measuring burette on its outlet port. Then the brake pedal must be applied by the foot. If — due to leakage of the primary seal or of the separating seal at the tandem master cylinder or due to any other reasons — brake fluid is drained from the working chamber of the master cylinder and flowing back into the compensating reservoir, this may be very easily noted at the burette with a high degree of accuracy. If the inventive method is not carried out properly any defect in the brake system may pass unnoticed. However, the improper application of the method does not affect the operability of the brake system. Since nowadays most of the hydraulic brake systems feature dual circuitry it is possible to place the burette successively on both outlet ports of the respective chambers of the compensating reservoir, thus any defects will become noticeable in either circuit. In this way, it may quickly be noted which of either circuit is responsible for the possibility of excessive travel of the brake pedal.

The inventive method is also suitable for locating clearance in those hydraulic brakes which are acted upon by a mechanical hand brake. In order to do this, the following steps would have to be taken:
 (a) put the hand brake on;
 (b) apply the foot brake, then release again;
 (c) release the hand brake and ascertain the volume of the brake fluid which is flowing back.

When applying this method the brake fluid volume displaced by the brake cylinders after the release of the hand brake must entirely enter the compensating reservoir. Thus the burette allows direct conclusions with regard to the clearance and hence to the proper operation of the adjusting device. According to the invention, the second object on which it is based is solved in that, above the outlet port of the compensating reservoir, an opening is provided for measuring purposes which can be closed and into which the burette will be introduced. This opening may either be the filling hole which is already provided for the brake fluid, or it may be a measuring opening which will especially be provided for the burette. The latter may be necessary above all in compensating reservoirs featuring several chambers, since in that case the individual opening will permit access to the various outlet ports.

An advantageous embodiment of a compensating reservoir according to the invention which is communicating with a master cylinder via an outlet port and which is provided with a float acting as level indicator and connected by a rod to a circuit-operating contact piece is characterized in that the rod penetrates the float and the contact piece and features a hollow cylinder design; and in that the outlet port and the measuring opening are arranged coaxially with regard to the rod. This embodiment allows the burette to be introduced through the hollow rod of the float and to be placed on the outlet port for the purpose of carrying out the checking method. The float will thus not disturb the application of the checking method.

The inventive method and a compensation reservoir designed in accordance with the invention will be explained in detail, reference being made to the drawing.

Said drawing schematically depicts a master cylinder 1 in which a master cylinder piston 2 can be axially displaced by means of a brake pedal 3. The master cylinder piston 2 has a primary seal 4 such as to allow the pressure medium to be displaced from a working chamber 5 via lines 6 into hydraulic brakes 7, 8, 9 and 10.

On the master cylinder 1, a compensating reservoir 11 is arranged which has an outlet port 12 through which brake fluid can flow from the inside of the compensating reservoir into the master cylinder 1. To this end, a compensating bore 13 leads from the outlet port 12 into the working chamber 5 directly in front of the primary seal while a fluid supply bore 14 leads into a chamber 15 behind the primary seal 4.

Inside the compensating reservoir 11 a float 16 is provided as level indicator. Said float 16 is provided with a rod 17 which is designed as hollow cylinder. At its upper end, a contact piece 18 is provided which will eventually sit on the contacts 19 and 20 and close a circuit as soon as the fluid level in the compensating reservoir 11 will have sunk below a predetermined level. In the compensating reservoir 11, a measuring opening 21, into which a burette 22 can be introduced, is provided coaxially with regard to the rod 17. The bottom end of said burette has the shape of a taper in order to allow the burette to be sealingly placed on the outlet port 12.

The inventive checking method will be carried out as follows: At first, the measuring opening 21 must be opened by removing a non-illustrated cover. Then the burette 22 will be introduced into the compensating reservoir 11 where it will be placed on the outlet port 12 in a sealing manner. If the brake system is absolutely free from defects, brake fluid, when pressing down the brake pedal, is allowed to come up into the burette only until the compensating bore 13 will have been passed. Thereafter, the fluid level in the burette should remain constant. If this is not the case then - with the vehicle being idle and the brake applied - this will be indicative of a leaking primary seal. In the case of a tandem master cylinder it also may be an indication of a possibly leaking separating seal.

Excessive disc brake run-out e.g. may be ascertained on a roller-type test stand. To this end, the brakes at first are applied shortly while the wheels are at rest. Then, rotation of the wheels will be started. The disc run-out will cause the brake discs to move the brake piston back into the brake cylinders. If the level of the brake fluid in the burette rises too much this will be indicative of excessive disc run-out.

We claim:

1. A method for locating defects in a hydraulic brake system with a master cylinder communicating with an outlet port of a compensating reservoir, characterized by sealingly placing a burette on the outlet port in order to respectively measure and ascertain the volume of brake fluid that flows from the master cylinder to the compensating reservoir after the brake has been applied.

2. A compensating reservoir, for use in locating defects in a hydraulic brake system, which communicates with the master cylinder via an outlet port, characterized in that, above the outlet port (12) a measuring opening (21) is provided which can be closed and which is adapted to receive a burette (22).

3. A compensating reservoir as claimed in claim 2, which is provided with a float acting as level indicator and connected by a rod to a circuit-operating contact piece, characterized in that the rod (17) penetrates the float (16) and contact piece (18) and features a hollow cylinder design; and in that the outlet port (12) and the measuring opening (21) are arranged coaxially with regard to the rod (17).

* * * * *